Sept. 4, 1928. F. M. ZOTTOLI 1,683,277

TIDE WATER SYSTEM

Original Filed June 6, 1922

INVENTOR
Frank M. Zottoli
by Macleod, Calver, Copeland & Dike
ATTORNEYS

Patented Sept. 4, 1928.

1,683,277

UNITED STATES PATENT OFFICE.

FRANK M. ZOTTOLI, OF BOSTON, MASSACHUSETTS.

TIDE-WATER SYSTEM.

Original application filed June 6, 1922, Serial No. 566,396. Divided and this application filed November 27, 1923. Serial No. 677,310.

The invention relates to a new and useful improvement in a tide water turbine wheel system and is a division of my application, Serial No. 566,396, filed June 6, 1922, now matured into Patent No. 1,484,980. The tide has the strongest current when it is midway between high and low tide and from that point diminishes as it approaches high tide or as it approaches low tide. For some length of time before and after the top of the flood and before and after the bottom of the ebb, there is very little current under natural conditions and for a short time at the top of the flood and at the bottom of the ebb there is no current at all and the water is dead, or in other words, dividing the difference between low tide and high tide into three parts, the current for the middle period is the most active and the current during the lower period and the upper period both in the rising and falling of the tide is much less active. That is, the current under natural conditions flows faster during the active middle period than it does at and near the top of the flood and at and near the bottom of the ebb.

The object of the present invention is to provide means for compensating for the above described difference in the normal activity of the tide water during the rising and falling of the tide and at the top of the flood and at the bottom of the ebb so as to produce a substantially uniform and continuous tide water operation of the water wheel or of a series of wheels in whichever direction the current is flowing.

The invention consists in providing a channel or sluiceway in which the water wheels are located, said channel or sluiceway being open to tide water at each end and providing a reservoir or storage basin communicating directly with the sluiceway, the passages between the sluiceway and reservoir being provided with a gate or gates which may be opened and closed at suitable times to admit water to the reservoir from the sluiceway and discharge water from the reservoir into the sluiceway. The difference in level between the water in the reservoir and that in the sluiceway causes an artificial current in the sluiceway.

The invention will be fully understood from the following description when taken in connection with the accompanying drawings, and the novel features thereof will be pointed out and clearly defined in the claims at the close of this specification.

Figure 1:
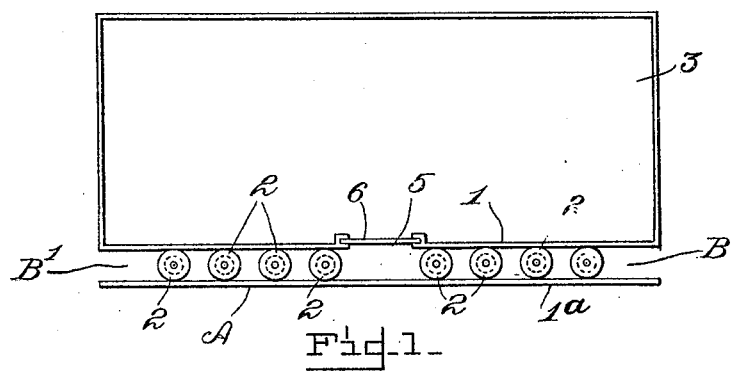
Fig. 1 is a diagram of a system having a single channel and reservoir embodying the invention and having a series of turbine wheels located in the channel.

Referring now to the drawings, in Fig. 1 there is shown a sluiceway A bordered by two walls or banks 1, 1ª in which are shown a series of turbine wheels 2 rotatable on vertical axes. This sluiceway is open at each end to tide water, as shown at B and B'. A storage basin or reservoir 3 is provided, which may be constructed in any suitable way, either wholly artificial or by utilizing the shore as a portion of the enclosure. One side may be one of the walls 1 of the sluiceway. This reservoir may be located in any convenient place and have suitable communication with the sluiceway. As shown in the drawings, the reservoir has communication as indicated at 5 with the sluiceway intermediate its ends and this is controlled by a gate 6. The exact location of the gate is immaterial provided it affords a proper communication directly between the sluiceway and the reservoir, so that the tide water enters the sluiceway before it enters the reservoir and the water passes out of the reservoir into the sluiceway.

To describe a cycle of operation, assume that the tide is flowing in and has risen to approximately three-fourths of its full amount of rise from low to high tide, the gate 6 up to that time being closed and tide water flowing through, in at one end and out at the other, and the turbines being operated by the velocity of the water which is accelerated by the housings in the sluiceway of the turbine. The gate 6 should now be opened and left open until the tide has risen to its full height and has fallen about one-fourth from full height. During this time, the gate being open, the water will run from both ends of the sluiceway and through the gate into the reservoir. The water thus flowing through the sluiceway into the reservoir, which is lower than the level in the sluiceway, gives rise to an artificial current in the sluiceway to rotate the turbines.

After the tide has fallen about one-fourth the gate 6 should be closed. The natural current of the tide flowing through the sluiceway will now be sufficient to rotate the turbines. The gates should remain closed until the tide has fallen about three-fourths when the level of the water in the sluiceway will be below the level of the water in the reservoir. The gate should be opened admitting water from the reservoir into the sluiceway which will thereby create an artificial current in the sluiceway. The gate should remain open until the tide has again risen about one-fourth. The gate should then be closed again and remain closed until the tide has risen about three-fourths during which period the velocity of the incoming tide will be sufficient to operate the turbines.

The sluiceway is always open to the sea or free tide water at each end.

Figure 2:
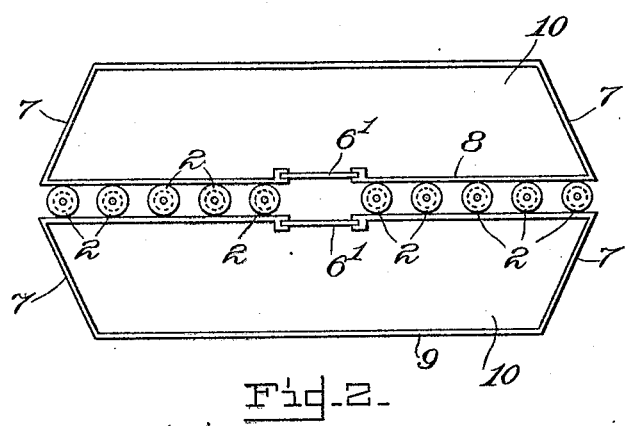
Fig. 2 is a diagram showing a system with a single channel and a double reservoir.

In the modification shown in Fig. 2, there are provided two reservoirs 10, 10, one on each side of the sluiceway each controlled by a gate 6', 6'. By this means both reservoirs may be filled from the sluiceway at the proper time and the water may be admitted to the sluiceway from both sides at the same time. In this form of construction, the end walls 7, 7 preferably converge toward each other outwardly and are diagonal with relation to the side walls 8, 9 respectively of the sluiceway. This is for the purpose of producing a deflection of floatage débris away from the sluiceway.

Figure 3:
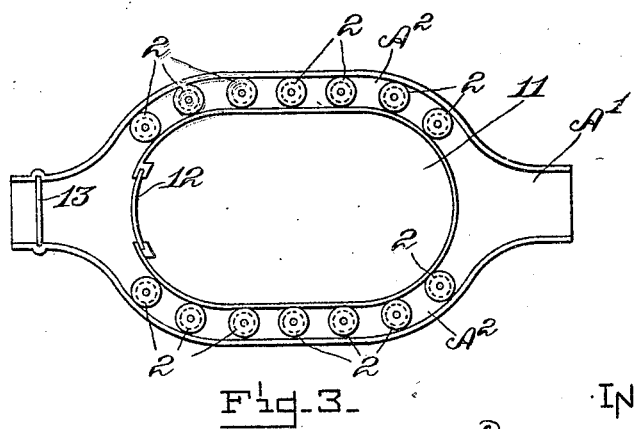
Fig. 3 is a diagram showing a system with a single reservoir and double channel.

In the modification shown in Fig. 3, there is provided a single reservoir 11 and a sluiceway A' which at one end of the reservoir divides into two branches A², A² which pass around on opposite sides of the reservoir and unite again at the opposite end. There is a gate 12 at one end of the reservoir and a gate 13 across the sluiceway at some distance away from the reservoir after the two branches are reunited so as to prevent the water from flowing out while the reservoir is being filled.

It is to be noted that in all of the several forms, the entrance to the reservoir is only by way of the sluiceway. The reservoir does not open to tide water except by first entering some part of the sluiceway.

The reservoirs shown in the several figures of the drawings are diagrammatic. It is to be understood that the reservoir may be of any suitable outline and constructed in any suitable manner. I contemplate, wherever possible, utilizing a portion of the shore line, as, for instance, a natural bay and providing an artificial wall only for such portion as is necessary to complete the enclosure of the basin.

The invention is intended to be applied to the use of large turbines set on a vertical axis in the sluiceway where they will be driven by the accelerated velocity of the tide water passing through the sluiceway in large quantities and not by the fall of the water on or through a turbine. The reservoir is for the purpose of making up all shortcomings in the head of the tides to accelerate the velocity of the water in passing through the sluiceway.

What I claim is:

1. In combination with a sluiceway open to tide water at all times at both ends and having at all times a free and open passage throughout its length from tide water to tide water, a turbine set to rotate on a vertical axis in said sluiceway, a reservoir, a passage between the reservoir and the sluiceway so located that tide water can enter the reservoir only by first entering the sluiceway and a gate controlling said passage.

2. In combination with a sluiceway open to tide water at all times at both ends and having at all times an open passage throughout its entire length from tide water to tide water through which tide water ebbs and flows, a turbine set to rotate on a vertical axis in such manner as to be operated by the accelerated velocity of water through the sluiceway in either direction, a reservoir having communication with said sluiceway intermediate its ends and means controlling said communication in such manner that the reservoir may be entirely closed or opened to the sluiceway at will when desired, while the sluiceway remains always open to tide water at each end.

3. The hereindescribed method of tide water operation of a turbine or turbines mounted in a water passage which is open at all times to tide water throughout its length and at both ends, said method consisting of opening an outlet from the water passage intermediate its ends to a poundage or reservoir having a lower level for a period during the normal sluggish state of the water before, during and after the lull of high tide, impounding the water so discharged, closing said outlet during the active intermediate period of the ebb of the tide until the level of the water in the said water passage falls below that of the impounded water, opening communication to admit the impounded water to the said water passage for a period during the latter part of the ebb and for a period during the first part of the rising of the tide, then closing said communication during the active intermediate period of the rising of the tide until the level of the water in the said water passage is above the bottom level of the reservoir or poundage.

4. In combination with a sluiceway at all times open to tide water at both ends and throughout its length, a plurality of turbine wheels set to rotate on vertical axes in said sluiceway, a reservoir surrounded by an enclosure having a passage from the reservoir into the sluiceway and means for opening and closing said passage at will, while the sluiceway remains open from end to end, said reservoir being closed to the entrance of tide water except by first entering the sluiceway.

5. In combination with a sluiceway open at all times at both ends to tide water and at all times open throughout its length, a turbine mounted to rotate on a vertical axis in said sluiceway, a reservoir, a passage between the reservoir and the sluiceway and a gate controlling the said passage to the reservoir without closing the direct passage through the sluiceway whether said gate is open or closed, said reservoir having no inlet nor outlet except the communication between the reservoir and the sluiceway.

6. The combination of a sluiceway and a reservoir having a gate controlling communication between the sluiceway and reservoir, a turbine set in the sluiceway to rotate on a vertical axis, said sluiceway being open at all times at both ends, one end toward the incoming tide, the other toward the outgoing tide so that during the middle period of incoming tide the natural current flowing through the sluiceway will operate the turbine set therein and during the middle period of the outgoing tide the natural current will operate the turbine, the reservoir being so situated and the gate being operable in such a manner that starting with the period shortly before high tide and continuing for a period shortly after high tide, the water entering through both ends of the sluiceway may be admitted through the gate into the empty reservoir whereby the currents formed in the sluiceway by the flow of water into the empty reservoir will operate the turbine, during the period a little before and after high tide and whereby, by operating the gate again at the period of low tide, the turbine in the sluiceway will be operated by the current in the sluiceway produced by its outflowing waters.

In testimony whereof I affix my signature.

FRANK M. ZOTTOLI.